United States Patent Office 3,268,055
Patented August 23, 1966

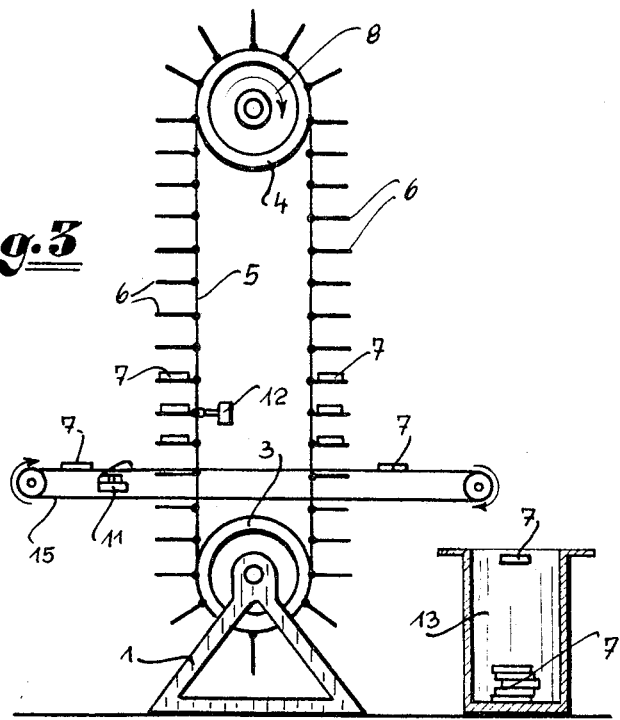
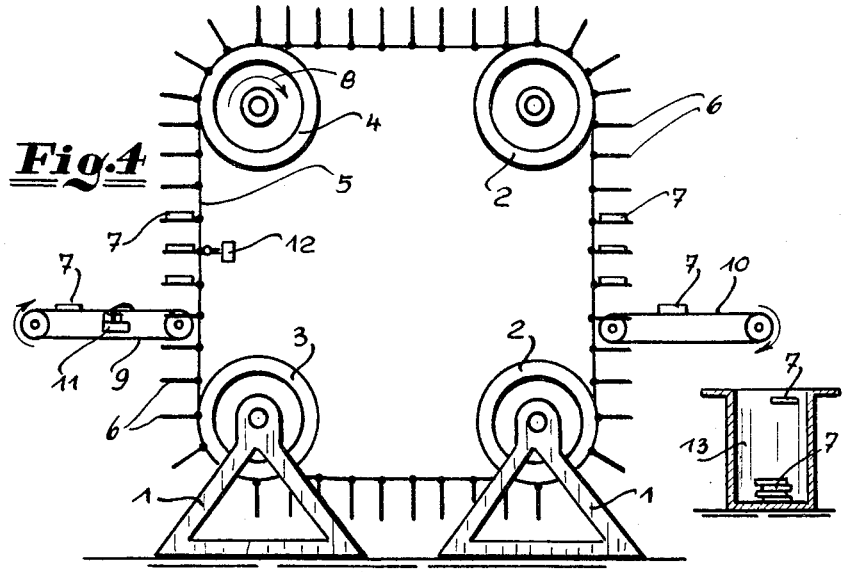

---

3,268,055
DRYING DEVICE FOR THE SOLES OF SHOES
Karl Stein, Friedrichstrasse 36, and Theo Bimber, Kirchbergerstrasse 32, both of Pirmasens, Germany
Filed Aug. 24, 1964, Ser. No. 391,535
Claims priority, application Germany, Aug. 24, 1963,
Sch 34,353; July 15, 1964, Sch 36,370
3 Claims. (Cl. 198—21)

The present invention relates to devices for drying shoe soles which have been coated with adhesive.

Soles designed to be glued onto shoes are coated with an adhesive which must dry before the sole is applied. Such soles are mostly coated with glue by adhesive-applying machines and are removed manually and put aside for drying.

Drying belts or bands are known on which the soles are able to dry during the time they require to traverse a specific conveying path.

An object of the invention is to provide for the depositing of glued soles on drying belts and the automatic removal thereof.

A drying device according to a preferred embodiment of the invention is thus intended for the drying of soles. It consists of a paternoster-like rotating conveyor member, on which are fixed places for the depositing of soles and the direction of motion of which is vertical or obliquely upwards at the charging side and vertical or obliquely downward at the discharge or removal side. The device is characterized in that there is arranged, both at the charging or feed side and at the removal side, a conveyor belt whose direction of motion at the feed side points towards the conveying member and at the removal side points away from the conveying member, and in that position feelers with se- of the conveying member, are provided adjacent the path of motion of the conveying member for the purpose of controlling step-by-step movement and stopping of the conveying member by one depositing division after a sole has been put onto the conveyor member.

A drying device developed in such a manner is not only able automatically to process the soles, but moreover advantageouly require only a small area of installation because of its upright construction.

Horizontally arranged conveyor belts are very long and require a great deal of space, because the adhesive requires a comparatively long time for drying. For this reason, it may not be sufficient to employ only one vertical or upright conveying device even though one such device makes better use of the available space. Also it must be considered that the height of the available space may be too limited to allow complete drying of the soles with one conveying device.

The present invention, therefore, proposes the case of one or more similar conveying members in series with a first conveying member, which receive and return the soles from and to the conveyor belt or belts.

According to one embodiment, the invention is such that the soles are deposited, by way of an intermediate belt, when arriving from the gluing machine, on a roller conveyor which, just like the intermediate belt conveys the soles from the side in front of conveying member and is set up close to the conveying member. Angular lever arms, which are driven to execute a rotating motion, jointly lift off the soles between and through the rollers of the roller conveyors and convey them between the places of deposit of the conveying member. For this purpose, the vertical legs or branches of the angular arms are connected at two points to the tracks or reaches of two belt drives traveling over drive and guide rollers.

In a drying device with a single conveyor belt, the conveyor belt runs through all conveying members in horizontal attitude and consists of two separate belts, there being arranged between the conveying members lifting arms which can be moved vertically between and through the separate belts, in order to lift the soles off the conveyor belt, and which move with their carrying or supporting surfaces between the places of deposit of the conveying members.

The invention further provides for a limit switch which is actuated by the places of deposit of the conveying members and which controls the cyclical motion of the conveying members and of the lifting arms. The invention also provides that the motion of the angular lifting arms and of their belt drives is controlled cyclically by engagement of the soles against a micro-switch.

The invention will be more clearly understood from the following detailed description as illustrated in the accompanying drawing in which:

FIGS. 1 and 2 respectively and diagrammatically show an embodiment of the invention and a detail thereof;

FIG. 3 diagrammatically shows another embodiment of the invention;

FIG. 4 shows still a third embodiment of the invention; and

The same members are provided with the same reference numerals in the different figures.

According to the invention, guide wheels 3 and 4 are positioned in a stand 1 (not shown in all its details), one of said wheels, for example, wheel 3, being connected by connection C1 to a geared motor M and serving as a driving wheel.

Figure 2:
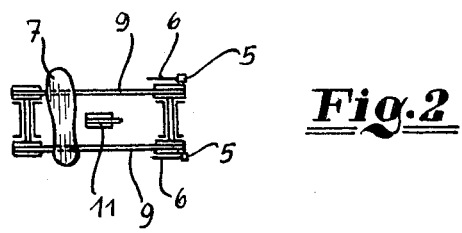

Deposit means 6 for receiving sole 7 are fixed at small distances on two chains 5 which travel over the wheels 3 and 4 and are guided by said wheels. Said deposit means can be developed as plates, racks or pins or in any other suitable manner. Instead of using a conveyance member consisting of two chains 5 according to FIG. 2, it is possible to use a conveyance member consisting of one chain only. Moreover, the chain or chains may also be replaced with other conveying members having, for example, the form of plates or cables or the like. Arrow 8 indicates the direction of motion of the chain 5.

A conveying means including a conveyor belt 9 is arranged on the feed side, and a conveyor belt 10 on the removal side. Both belts are guided over guide rollers which are driven by a common electric motor or by separate electric motors. The conveyor belts used may be conventional belts made of fabric, leather or rubber, or else, V-belts, or even chains. A conveyor belt in the meaning of the invention also includes a track consisting of juxtaposed, driven rollers; i.e., a roller train.

A contractor or micro-switch is arranged between the belts forming the conveyor 9. The contactor 11 is illustrated as a feeler sensing member that can be actuated by an actuating arm. Said feeler is actuated when a sole 7 to be fed to the drying device depresses the actuating arm. Contactor 11 is coupled by line L1 to motor M and controls the latter. Instead of using the contactor 11, it is also possible to use other devices such as, for example, a sensing or scanning device formed of a photocell and a source of light.

Another sensing means including a contactor or microswitch 12, also connected to motor M (via line L2), is so arranged that it is actuated by the rollers of the chain 5 or else, by cams (not shown) fixed on the chain 5. The two feelers or sensing members, namely, the contactors 11 and 12, may also be arranged elsewhere. The contactor 12 furthermore may be constituted in any of the ways indicated for the contactor 11. It is preferable to use electric limiting sensing or scanning members.

A container 13 in which the dried soles 7 are stacked stands below the end of the conveyor belt 10.

The device operates in the following manner:

The glue-coated soles arrive from the adhesive-applying machine and drop onto the conveyor belt 9. In specific cases, a chute or slide or other such intermediate conveying device must be arranged between the gluing machine and the conveyor belt 9. The soles 7 are guided by the conveyor belt 9 over the feeler 11 which is thereby actuated and switches on the driving motor M for the conveying member formed of chains 5. Since the conveyor belt 9 acts to convey the sole whose presence is sensed, the latter comes into engagement with the chains 5 and is lifted off the conveyor belt 9 by the deposit means 6 connected to the moving conveying member 5. The conveying member 5 stops again, as soon as the feeler 12 is actuated. The soles 7 thus travel incrementally with the step-by-step conveying member 5, upwardly on the feed side thereof and downwardly on the other side, i.e., the removal side, until they land on the conveyor belt 10 which conveys the soles away from the chain 5 and the deposit means 6. The belt 10 discharges the soles into the container 13. The length of the circulating track of the conveying member 5 is dimensioned in such a manner that the time needed for the movement between the place of feed and the place of removal is sufficient for drying. If necessary, blowing apparatus or radiant lamps may be installed for promoting the drying process. The feeler 12 is arranged in such a manner that the conveying member 5 stops in a position in which the deposit means 6 are not located at the level of the conveying zone of the conveyor belt 9 so as to avoid that an arriving sole 7 strikes against the deposit means 6.

As shown in FIG. 3, a single belt 15 may be used instead of the two belts 9 and 10. When a two-chained conveying member 5 is used, the single conveyor belt 15 may be guided between and through the two chains of the conveying member.

In the arrangement according to FIG. 4, the top and bottom horizontal portion of the paternoster-like path of motion of the conveying member 7 is extended in that there are provided, in addition to the guide rollers 3 and 4, two additional rollers or wheels 2, the axes of which form with the axes of the wheels 3 and 4 the corners of an upright rectangle.

Figure 5:
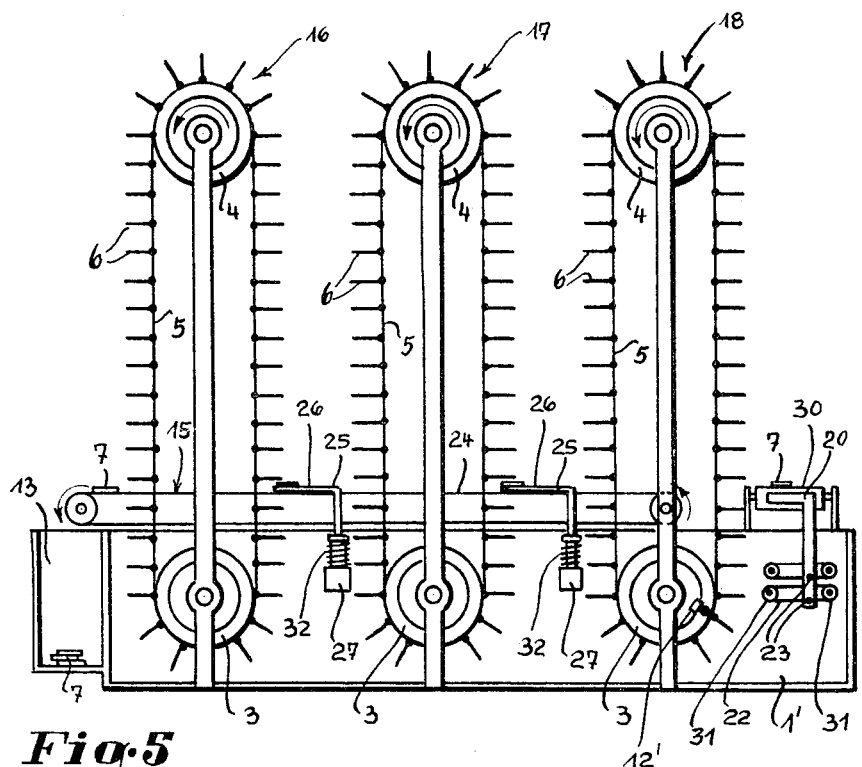
FIGS. 5 and 6 are respectively a side view and a top view of a fourth embodiment.
Figure 6:
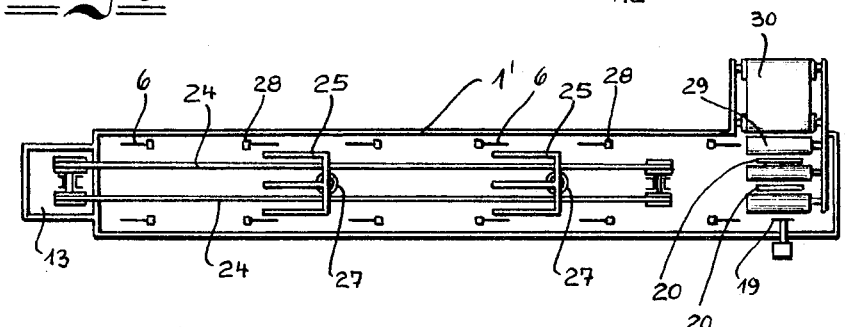

FIGS. 5 and 6 show another embodiment. The drying device is shown perspectively in FIG. 5; FIG. 6 shows a top view thereof.

The conveying members 16, 17 and 18 are supported on a common stand 1'. 15 is the conveyor belt. Each conveyor member is composed of two guide wheels 3 and 4 and two chains 5 positioned thereupon and provided with deposit means 6 spaced at regular intervals. A device for conveyong the soles 7 from the gluing machine to the conveying members is positioned ahead of said conveying members. Said device consists of an intermediate belt 30 and roller conveyor 29. A contactor 19 is located at the other end of the roller conveyor 29.

Angular arms 20 executing a rotating motion can be moved between and through the rollers or rolls of the roller conveyor 29. The rotating motion of said arms is brought about by the fact that the angular arms 20 are connected at the point 23 to a synchronized track or reach of the belt drive 22. Said belt drive 22 travels over the driving sliding rollers 31.

Lifting arms 25 are provided between the conveying members 16, 17 and 18. Said arms are able to grip through the two individual belts 24 of the conveyor belt 15. The lifting arms 25 have a carrying or supporting surface 26, on which the soles are placed. Element 27 is an electro-magnet which pulls the lifting arm under the individual belt 24 against the force of a relatively strong spring 32. When the magnet is deactivated, the force of the spring 32 presses the lifting arm upwardly between the individual belts 24 and removes therefrom the transported member, a sole 7 coated with adhesive.

Cyclic stroke-by-stroke control of the driving guide rollers for moving the angular arms 25 as effected by a sole 7 striking against the contactor 19. The rhythmic control of the remaining plant, i.e., of the conveying members and of the lifting arms 25, is effected by the contactor 12, which is actuated by a stop 28 on the chains 5.

The machine operates in the following manner:

A sole 7 arrives from the gluing machine on the intermediate belt 30 and is thence conveyed onto the roller conveyor 29 until it strikes against the contactor 19. The latter releases one completely circular motion of the angular arms, which lift the sole 7 from the roller conveyor 29 with the angular lifting arms and convey the sole, in the course of the circular motion, to be deposited on the next available deposit means 6 of the conveying member 18.

The three conveying members 16, 17 and 18 are driven at the same speed. Said speed is controlled, after the driving motion has been initiated, by the contactor 12', which is released by a stop 28 traveling past the same. The sole is conveyed from the conveying member 18 onto the conveyor belt 15 and is there placed on the individual belts 24. The contactor 12' releases the motion of the lifting arm 25 at the right moment in that it inactivates the magnet 27. The spring 32 presses the lifting arm 25 upward. The lifting arm 25 removes the sole 7 from the conveyor belt 15 and places it between two deposit means 6 of the conveying member 17. The conveying member 17 continues to move in time and removes the sole 7 from the lifting arm 25, then transports it over and around the guide wheel 4 and deposits it again picked up by the next lifting arm 25 and is conveyed between two deposit means 6 of the conveying member 16. The conveying member 16 again deposits the sole 7 on the conveyor belt 15 which discharges the sole into the container 13.

Figure 1:
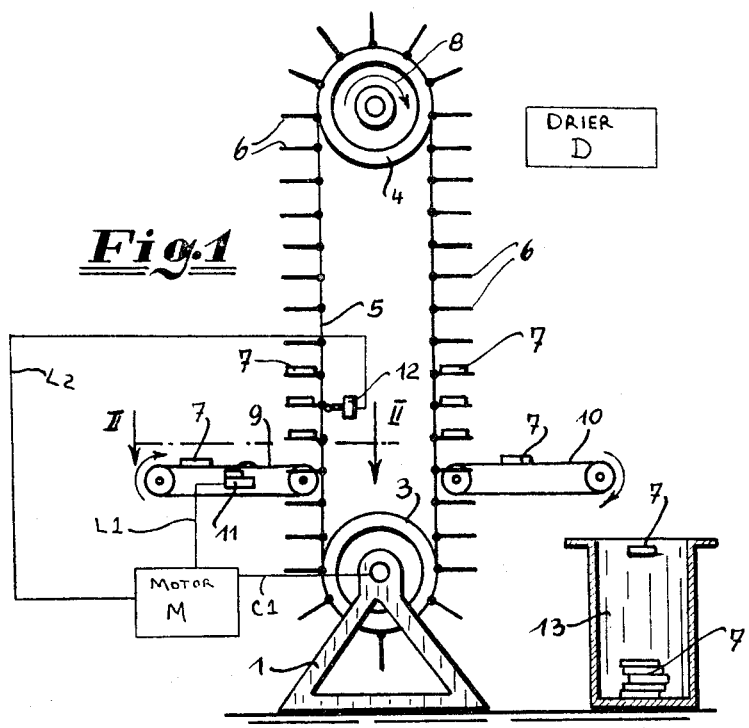

In any of the aforesaid devices, a drying device such as drier D shown in FIG. 1 can be employed in operative association with one or more of the conveyor means. As stated hereinabove, drier D may include blowers, heat radiating devices or the like.

What is claimed is:

1. Apparatus for the drying of shoe soles to which adhesive has been applied, said apparatus comprising a generally vertical conveyance means having feed and removal sides and including spaced deposit means adapted for receiving soles for the transport thereof along a determinable vertical path from said feed to said removable side, conveying means operatively associated with said vertical conveyance means and directed towards the feed side of and away from the removal side of the latter, drive means for driving said vertical conveyance means, first sensing means operatively disposed relative to said conveying means to sense the presence of a sole on the latter and the conveying thereof towards the feed side of said conveyance means and to activate the drive means to drive said vertical conveyance means whereby the conveyed sole is deposited on one of said deposit means and transported thereby, and second sensing means to sense a predetermined displacement of the vertical conveyance means and to respond thereto to control said drive means to halt the displacement of the vertical conveyance means until the sensing of the next sole being conveyed to the feed side of said vertical conveyance means, said conveying means comprising a conveyor juxtaposed to the feed side of said vertical conveyance means, arms operatively disposed relative to said conveyor, and means to drive said arms along a generally circular path to lift soles from the conveyor and place the same in said deposit means.

2. Apparatus as claimed in claim 1 wherein said means to drive said arms comprises two generally parallel, endless belts, said arms being connected to each of said belts.

3. Apparatus for the drying of shoe soles to which adhesive has been applied, said apparatus comprising a generally vertical conveyance means having feed and removal sides and including spaced deposit means adapted for receiving soles for the transport thereof along a determinable vertical path from said feed to said removable side, conveying means operatively associated with said vertical conveyance means and directed towards the feed side of and away from the removal side of the latter, drive means for driving said vertical conveyance means, first sensing means operatively disposed relative to said conveying means to sense the presence of a sole on the latter and the conveying thereof towards the feed side of said conveyance means and to activate the drive means to drive said vertical conveyance means whereby the conveyed sole is deposited on one of said deposit means and transported thereby, and second sensing means to sense a predetermined displacement of the vertical conveyance means and to respond thereto to control said drive means to halt the displacement of the vertical conveyance means until the sensing of the next sole being conveyed to the feed side of said vertical conveyance means, at least one further vertical conveyance means operatively associated with said conveying means and adapted to receive, from said conveying means, soles previously processed by the first said vertical conveyance means, said conveying means traversing all of said vertical conveyance means and including at least two spaced and parallel conveying members, said apparatus further comprising lifting arms disposed between the conveying members and means coupled to said arms to enable the latter to lift soles from the conveying members for deposit on the said deposit means.

References Cited by the Examiner
UNITED STATES PATENTS

| | | | |
|---|---|---|---|
| 1,615,237 | 1/1927 | Schwartz | 198—135 X |
| 3,189,160 | 6/1965 | Holland | 198—135 X |

FOREIGN PATENTS 538,500  6/1955  Belgium.

EVON C. BLUNK, *Primary Examiner.*

R. E. KRISHER, *Assistant Examiner.*